3,228,800
LOW POWER OUTPUT DEFERRED ACTION
TYPE PRIMARY BATTERY
Roy C. Kirk, Midland, Mich., assignor to The Dow Chemical Company, Midland, Mich., a corporation of Delaware
Filed Aug. 3, 1964, Ser. No. 388,345
3 Claims. (Cl. 136—100)

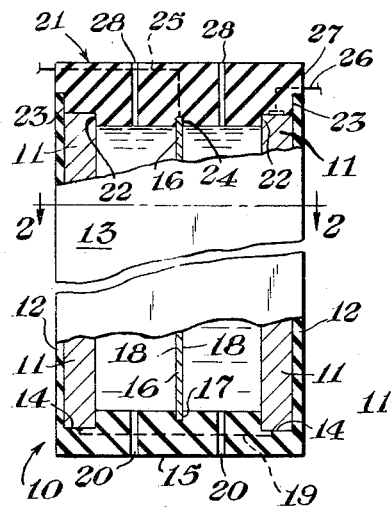
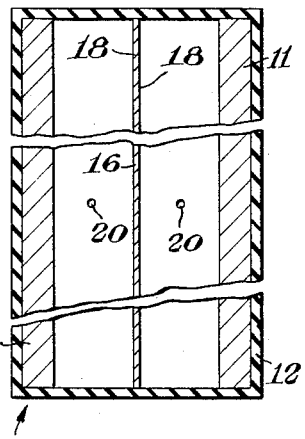
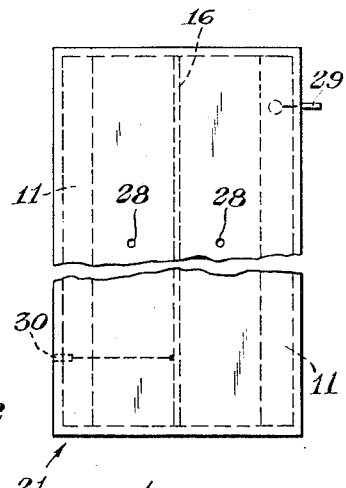
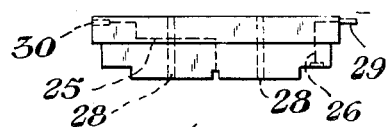
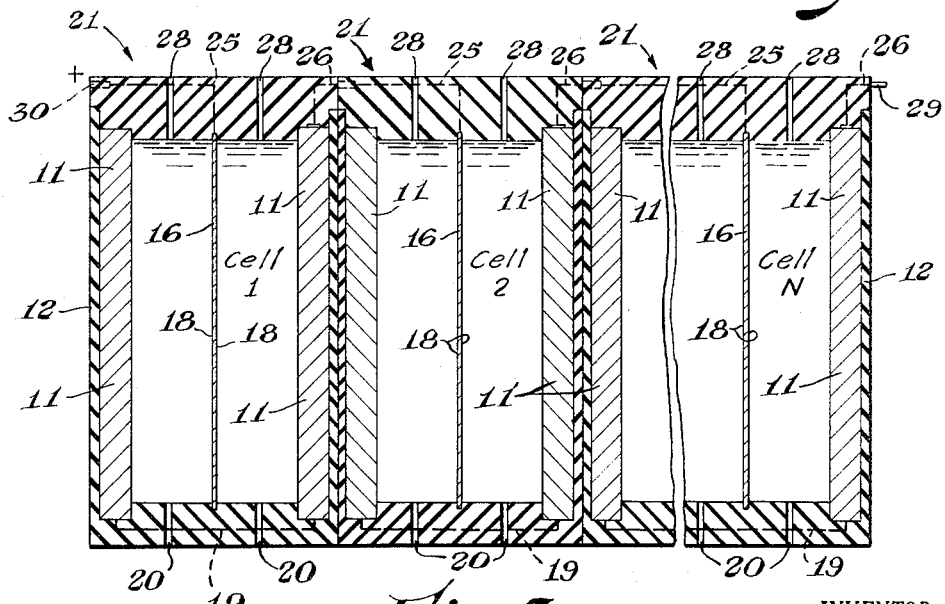
INVENTOR.
Roy C. Kirk
BY C. Kenneth Bjork
AGENT United States Patent Office 3,228,800
Patented Jan. 11, 1966

This application is a continuation-in-part of patent application Serial Number 107,390, filed May 3, 1961, now abandoned.

This invention relates to a low voltage primary cell system and more particularly is concerned with a multi-celled low-voltage primary battery utilizing magnesium, magnesium-base or aluminum base alloy anodes.

It is a principal object of the present invention to provide a multi-celled, low voltage primary battery capable of operating at low power outputs for long periods of time.

It is another object of the present invention to provide a primary battery which will operate satisfactorily for an extended period of time without the need of service or maintenance.

It is an additional object of the present invention to provide a primary battery composed of a multiplicity of cells utilizing a common electrolyte wherein inter-cell shorting through the electrolyte is held to an ecceptable low level over long periods of operation.

It is a further object of the present invention to provide a multi-celled low power output primary battery activated by immersion in sea water which battery can be used to power light and sound buoy navigational aids as well as anti-submarine sonar devices and sonobuoys.

It is also an object of the present invention to provide a multi-celled primary battery of unique novel construction which by means of predetermined sized vents gives a pumping action whereby electrolyte is introduced into the battery and reaction gases passed out of the battery during operation with a minimum, acceptable low level of intercell shorting.

These and other objects and advantages will become apparent from the detailed description presented hereinafter when read in conjunction with the accompanying drawings.

In the drawings:

FIGURE 1 is a side view, partly in section, of one embodiment of a unit cell used in the battery of the present invention.

FIGURE 2 is a cross-sectional view of the unit cell taken along line 2—2 of FIGURE 1.

FIGURE 3 is a cross-sectional view of a battery prepared from a plurality of the unit cells shown in FIGURE 1 wherein the cells are connected in series.

FIGURE 4 is an end-view of a cap member for a cell shown in FIGURE 1 having a particular electrode connecting means integral therein.

FIGURE 5 is a top view of the cap member shown in FIGURE 4.

In general, the battery consists of a plurality of individual cells, or modules, connected in series. Each of the modules contains at least one or more magnesium, magnesium based, or aluminum based alloy anodes, one or more electron conducting cathodes selected from a material having a Standard Electrode Potential ranging between about +1 and about −1.5 volts (based on hydrogen voltage being 0 at 25° C.) and an aqueous electrolyte solution. The cells are encased or otherwise provided with means giving inlet and outlet vents of predetermined ratios of cross-sectional area/vent length whereby a resistance path of electrolyte is formed which gives tolerable amounts of intercell shorting during operation.

In one embodiment of the present invention shown in the drawings each cell 10 contains two anodes 11. Each of these anodes is positioned inside and adjacent to one of the side walls 12 of an open-topped, rectangularly sided, hollow, non-electron conducting case 13. The anodes 11 are held in place by indentations 14 on opposite sides of the interior bottom 15 of the case 13 adjacent the walls 12. A thin plate-like cathode 16 is positioned in a groove 17 cut part way into the bottom and along the center axis of the bottom 15 of the case 13 so that the faces 18 of the cathode 16 are parallel to those of the anodes 11 at the sides of the case.

Additionally, a conductive strip, or wire, 19 embedded into the bottom 15 of the case 13 makes contact with the bottom edge of both of the anodes 11 in the groove or indentations 14 thereby joining these in parallel. Small inlet vent holes 20 are incorporated into the bottom 15 of the case 13.

A non-electron conducting cap or top 21 having indented shoulders 22 designed to hold the top edges of the two anodes 11 against the side wall 12 of the case 13 and a second set of indented shoulders 23 near the outer edge of the cap slidably engages the inner surface of the side wall 12 of the case 13. This cap 21 also is fitted with a groove 24 running the length of the cap along its center axis to accommodate the upper edge of the cathode 16 thereby securing it in a fixed position in the cell.

This cap 21 contains conducting strips or wires similar to that embedded in the bottom of the case. One of these 25 contacts the top of the cathode and extends outwardly through one side of the cap 21 above the case top whereby the end of this lead can be connected to a lead from the anode of an adjacent cell in the battery. Another connection 26 contacts one of the anodes 11 and extends outwardly through the adjacent edge 27 of the cap 21. This connection, or lead, 26 from the anode permits connection with the lead from the cathode of an adjacent module. The cap 21 contains outlet vents 28.

One particularly useful design of the cap is shown in FIGURES 4 and 5. In this particular embodiment, the connection from the anode lead 26 ends in a jack 29 extending outwardly from one side of the cap 21 and the cathode lead 25 ends in a mating plug 30 on the opposite side of the cap 21. With these terminal connections, any individual cell readily can be connected to a second cell and this in turn to a third cell, etc. in series arrangement to give a battery of predetermined power output. The leads in the terminal cells of the battery likewise can be readily attached directly to the unit receiving the power or to leads from this device.

FIGURE 3 shows in section a battery prepared from a plurality of cells described hereinbefore. In construction of the battery, the prime concern is that the connections and leads joining the cells be protected from the electrolyte environment. This is especially true for those batteries which are to be immersed in the electrolyte during operation. This problem is alleviated by coating the leads with an electrolyte resistant coating, e.g. asphalt, tar, rubber, plastic, etc. after making the connection. Alternatively the entire cell assembly can be covered or protected by an enveloping protective jacket.

The cells themselves also can be physically joined, for example by adhesively bonding together walls of adjacent cells, holding the cells in a fixed position by means of a brace, strapping means or the like or by any other means known to one skilled in the art.

In batteries designed for sea water use or other operations where the entire unit is immersed in the electrolyte, there is no need to fill the battery with electrolyte prior to immersion as the electrolyte conveniently fills the battery by flowing through the vent holes upon immersion in the liquid environment. For other installations the battery can be provided with or otherwise connected to an electrolyte supply source or reservoir from which electrolyte is introduced into the battery through the inlet vent holes. In both cases the gases produced during reaction and electrolyte which has passed through the modules during operation exit through the exit vents in or near the top of the battery.

Operability of the present battery with tolerable low amounts of intercell shorting is achieved by use of this inlet-outlet vent system and is related both to the total open space provided by the vent holes system of a given battery and the diameter of the individual vents. For operability in a battery, the diameter of the vent holes is maintained between about $\frac{1}{64}$ to about $\frac{1}{4}$ inch, preferably between about $\frac{1}{32}$ to about $\frac{1}{16}$ inch. Within this range, the sum of the ratios of cross-sectional area to length of the events is maintained at from about 0.001 to about 0.2, usually from about 0.005 to about 0.5 and preferably from about 0.01 to about 0.02.

For the larger diameter vents in order to realize the operable vent hole cross-sectional area/vent length ratio, tubes jutting out from the battery into the electrolyte supply can be used, for example.

By maintaining the vent system within the size ranges set forth herein, intercell shorting is maintained at an acceptable low level, e.g. as low as 10 percent or less, during cell operation thereby assuring that a high percentage of the magnesium consumption during battery operation is utilized in useful power generation. Additionally, with use of this well-defined vent system, a natural pumping action moving electrolyte through the battery also is realized.

The anode material used in the cells ordinarily is magnesium or a magnesium based alloy having a magnesium content of at least 80 weight per cent which can be fabricated into the desired shape. Desirably the selection of the anode material is made from those alloys wherein optimum cell voltages and high anode efficiencies can be realized. Especially useful anode materials are those alloys which contain about 1 weight percent mangnese or from about 1 to about 6 weight percent aluminum.

Examples of a number of useful alloys are the commercially available ASTM designated AZ31, AZ10, AZ63, AZ61, A3A, AZ21, M1 and the like magnesium based alloys.

Aluminum base alloys exhibiting an electropotential of the same order of magnitude as magnesium or its alloys as set forth hereinbefore, also can be used as an anode material.

The size of the anode is dictated by the size limitations of the cell. The thickness of the anode will be determined by the length of operating life desired in the cell. Normally, for most operations the anode thickness will range from about 0.010 up to about 0.50 inch or more.

The cathode of the cell is a thin sheet-like member and can be fabricated from any of a number of electron-conducting materials having a standard electrode potential of between about +1 and −1.5 and including, for example, mild steel, nickel, iron, copper, chromium, stainless steels, carbon, brass and the like. Those cathode materials which normally are corrosively attacked in the presence of the electrolyte media employed can be used in the present battery as they are cathodically protected by the magnesium anode. With this type of cell, because of the low current drain during operation close spacing of the electrodes is not necessary and the electrolyte ion path resistivity can be very high. Therefore, the electrodes can be positioned sufficiently far apart to insure there is no undesirable build up of corrosion product and clogging of the space between electrodes by this material.

The outer case, or container, of the cell and the cap for this case can be prepared from any of a wide variety of insulating, non-electron conducting materials possessing the requisite properties and characteristics to meet environmental and structural conditions and limitations to which the battery may be subjected. Natural and synthetic rubbers, silica glasses, ceramics, phenolformaldehyde resins, polystyrene resins, polyethylene, polypropylene, asphalt based materials, hydrophobic waxes, acrylic resins sold under the trademark Lucite, Saran and the like are illustrative of the insulators useful for this application.

The cases and caps can be fabricated by conventional forming techniques such as molding, extruding, drawing and the like. Conveniently, the connections for joining the cathodes and anodes in parallel, if there are more than one of each of these species in a given cell and for joining two or more cells in series to form the multicelled battery can be embedded and positioned in the case and cap member during the forming operation as set forth hereinbefore.

Although any of a wide variety of aqueous electrolyte solutions are useful to activate the present cell, preferably the electrolyte for the cell will be selected from the group consisting of sea water, the alkali metal chlorides and bromides, ammonium chloride, ammonium bromide and the alkaline earth metal chlorides and bromides including magnesium chloride and magnesium bromide. These electrolytes can be used alone or as mixtures.

The concentration of the electrolyte to be used is not critical as satisfactory performance is obtained using sea water which contains as the prime solute about 3% by weight sodium chloride and even more dilute solutions, i.e. those containing about 1% or less by weight solute, as well as more concentrated electrolytes including even those which are saturated with the solute member.

In preparing the individual cells, the spatial configuration is such that the minimum electrolyte volume capacity is about 1.5 times that of the magnesium required in the module. This volume relationship is needed in order to accommodate the corrosion products formed during the operative life time of the cell. The volume itself can be obtained by spacing the electrodes the requisite distance apart in the cell, or, alternatively if it is desired to keep the electrodes more closely spaced together, the module can be provided with a sludge pit in the bottom.

To further illustrate the present invention, a battery was prepared according to the embodiment shown in FIGURES 1–3. This battery was required to be capable of delivering 2 watts at 6 volts for a period of at least 2 years in sea water and was to have a weight limitation of 500 pounds (less electrolyte) and a volume limitation of 10 cubic feet.

Utilizing a magnesium-manganese alloy composition containing about 0.8–0.9 weight per cent manganese and the balance magnesium for the anodes, ASTM designation M1 alloy, two 20 inch x 20 inch x 0.30 inch plates were positioned against adjacent walls of a hard rubber case designed to accommodate the plates. Both the wall and bottom thicknesses of the case were about 0.25 inch. An electron conducting lead wire, embedded in the bottom of the case, contacted both of the anodes as these were positioned in the indentations in the bottom of the case thereby connecting these anodes in parallel relationship. A mild steel plate cathode (20 inch x 20 inch x 0.031 inch thick) was mounted in the groove across the center of the inside bottom of the case. Two electrolyte inlet vents, $\frac{1}{32}$ inch diameter, were formed into the bottom of the case as shown.

The internal dimensions of the case were such that spacing between the face of the cathode plate and that of each of the anodes opposite was about 0.81 inch. Since the inside wall length and height of the case was almost the same as that of the anode, a cell of this width had a total electrolyte volume chamber of about 648 cubic inches. The total volume of the two anodes was about 240 cubic inches. This cell thus had an electrolyte volume chamber about 2.7 times larger than the anode volume.

A hard rubber cap having shoulders which retained the anodes in place as shown in the FIGURES 1–3 and containing a groove to accommodate the upper edge of the cathode was then fitted onto the top of the case and firmly joined thereto by means of an adhesive. This cap contained a lead wire which contacted the cathode and extended out through one side of the top as well as a second lead contacting one of the anodes which lead extended through the side of the cap adjacent to the anode position. The cap also contained two vent holes, each having a diameter of about 1/64 inch.

Fifteen of such cells were connected in series. The exposed lead wires and connections were suitably covered to insure that these could not come into contact with the electrolyte. The cells were then bound together to form a compact unit.

The overall volume of the resulting battery was about 8.7 cubic feet and the total weight of the structure, excluding electrolyte, was about 375 pounds. The sum of the ratios of cross sectional area/length of the vent holes for the battery was about 0.11.

Laboratory data was obtained for a single cell having an anode of this same magnesium alloy composition and a mild steel plate cathode discharged for 50 days in an aqueous 3 percent by weight sodium chloride solution. At the end of this period, the cell voltage of the test cell was about 0.4 volt at a current density of about 60 milliamperes per square foot and was quite stable.

Additionally, a 5-cell laboratory-scale battery, generally similar to that shown in FIGURE 3, was prepared as follows:

Individual cells were fabricated utilizing an open-topped rectangularly shaped wall Lucite container having an internal opening about 3 inches long by 3 inches high by 0.75 inch wide. A thin steel cathode plate about 3 inches by 3 inches was positioned in the center of the cell so that it was parallel to the long side walls of the Lucite container. Two AZ31 alloy plates about 3 inches by 3 inches by 0.050 inch thick were placed in the container, one each on either side of the cathode so that the distance between each cathode face and that of the anode opposite was about 1/4 inch. These anodes were connected in parallel. A Lucite top about 5/8 inch thick was fitted securely to the case and also served to hold the anodes and cathode in position. Lead wires, one each from the cathode and one of the anodes extended out through the container. One 1/32 inch vent hole was drilled on an angle through the 1/4 inch thick end wall of the container near the bottom and a 1/16 inch hole was drilled through the cap near the side at one end. This provided a total cross-sectional area/length of vents, based on the two vents for the cell of 0.008.

The individual cells were then connected in series and fastened together in such a fashion that the vent holes in the caps, when viewed from above, presented a zig-zag staggered pattern. This vent-hole pattern served to increase the ion resistivity path between cells thereby aiding in minimizing inter-cell shorting. This provided a total vent system cross-sectional area/length ratio for the five cells of about 0.04.

In assembling the 5 cells into the battery, care was extended to protect the leads and insure that no electrolyte came into contact with the connections between cells.

The battery was immersed in a natural sea water electrolyte so that all of the cells were in contact with the common electrolyte which passed through the vent holes.

This battery operated at about 2.2 volts (0.44 volts/cell) at a current density of about 53 milliamperes/square foot. Further, during operation of the battery, hydrogen gas was observed escaping through the vent holes in the cap.

As a control, a single cell of the same composition geometry and configuration was immersed in another bath of the same electrolyte. This cell was found to operate at about 0.44 volts at substantially the same current density as the five-celled battery. The voltages shown by the single cell and the five-cells connected in series indicate that inter-cell shorting in the multi-celled battery is negligible.

Extrapolation of the data obtained in these laboratory tests indicated that the illustrative sea water battery described herein could be expected to deliver the required 2 watts at 6 volts for at least two years when used to power a visula, audio or radio navigational aid or sonar device, a sinobuoy or other similar device requiring a low power drain.

The above-described battery is only one embodiment of a cell design as will be recognized by one skilled in the art and is not meant to be limiting.

In a manner similar to that shown hereinbefore, a battery having a multiplicity of cells prepared using circular AX21 magnesium alloy anodes, iron cathodes, a 20 percent solution of magnesium bromide as electrolyte and a vent containing fluid-tight polystyrene case with a sump at the bottom can be prepared.

Additionally, cells containing a single AZ10 rectangularly shaped anode and a single similarly shaped brass cathode utilizing a silica glass case and an aqueous solution of 1% potassium bromide electrolyte can be prepared. A number of these cells can be connected in series and bound together by a strapping device to give a satisfactory battery which will operate for long periods at a low voltage.

Also, elliptically shaped cells utilizing AX63 plate anodes, nickel cathodes, a ceramic case and an aqueous solution saturated with magnesium chloride can be connected in series and then placed in an enveloping polyethylene case.

Likewise a battery can be constructed from cells having cell magnesium anodes, graphite cathodes, a synthetic rubber case and top and utilizing a calcium chloride electrolyte.

Similarly aluminum based alloys exhibiting an electropotential of from about 1.1 to about 1.5 volts or more (as measured versus saturated calomel) also can be used in any of the battery configurations disclosed herein.

Other modifications can be made in the present invention without departing from the spirit or scope thereof for it is understood that I limit myself only as defined in the appended claims.

I claim:

1. A primary battery which comprises; a plurality of individual cell modules each of said modules containing two plate-like anodes, said anodes being a magnesium based metal containing at least 80 percent by weight magnesium, each of said anodes positioned inside and adjacent to one of the side walls of an open-topped rectangularly sided hollow non-electron conducting case, said anodes being held in place by indentations on opposite sides of the interior bottom of said case and adjacent the walls of said case, said anodes joined in parallel arrangement by a conductor embedded in the bottom of said case and contacting the bottom of each of said anodes, said bottom of said case fitted with a groove cut part way into said bottom along the center of said bottom, said groove accommodating a plate-like cathode, said case having at least on inlet vent on each side of said cathode having a diameter of from about 1/64 to about 1/4 inch, said case having a non-electron conducting cap, said cap having two sets of indented shoulders, one above the other at each end of said cap, one of said sets at the bottom of said cap holding the top of said anodes against the side walls of said case and the second set of said shoulders mating with the inner walls of said case as said cap is fitted on said case, said cap fitted with a groove running the length of the cap along its center and accommodating the upper edge of said cathode as said cap is fitted on said case, said cap containing a conductor embedded in said cap and contacting the top of said cathode and extending outwardly through one side of said cap, a second conductor embedded in said cap contacting the top of one of said anodes and extending outwardly through the adjacent edge of said cap, said cap fitted with at least one outlet vent on each side of said cathode having a diameter ranging from about 1/64 to about 1/4 inch, said anodes and cathode positioned apart so that the internal volume of said cell is at least 2.7 times the volume of said anodes, the sum of the ratios of the cross-sectional area to length of said vent inlets and vent outlets ranging from about 0.001 to about 0.2, each of said modules adapted to be filled with an aqueous electrolyte, said electrolyte passing into, through and out of each of said modules by means of said vents during cell operation, and said modules connected electrically to each other in a series arrangement.

2. The battery as defined in claim 1 wherein the anodes are a magnesium binary alloy having a nominal composition of about 0.8 to about 0.9 weight percent manganese, the balance being magnesium.

3. The battery as defined in claim 1 wherein the cathode is mild steel.

References Cited by the Examiner
UNITED STATES PATENTS

| | | | |
|---|---|---|---|
| 2,655,551 | 10/1953 | Ellis | 136—100 |
| 2,715,653 | 8/1955 | Reid | 136—155 X |

WINSTON A. DOUGLAS, *Primary Examiner.*